(12) United States Patent
Petersson et al.

(10) Patent No.: US 10,767,540 B2
(45) Date of Patent: Sep. 8, 2020

(54) EXHAUST GAS TREATMENT APPARATUS

(71) Applicant: VOLVO TRUCK CORPORATION, Gothenburg (SE)

(72) Inventors: Martin Petersson, Hisings Kärra (SE); Johan Törnberg, Gothenburg (SE)

(73) Assignee: VOLVO TRUCK CORPORATION, Göteborg (DE)

( * ) Notice: Subject to any disclaimer, the term of this patent is extended or adjusted under 35 U.S.C. 154(b) by 229 days.

(21) Appl. No.: 15/576,807

(22) PCT Filed: Jun. 3, 2015

(86) PCT No.: PCT/EP2015/062433
§ 371 (c)(1),
(2) Date: Nov. 25, 2017

(87) PCT Pub. No.: WO2016/192791
PCT Pub. Date: Dec. 8, 2016

(65) Prior Publication Data
US 2018/0306085 A1    Oct. 25, 2018

(51) Int. Cl.
*F01N 9/00*    (2006.01)
*F01N 3/08*    (2006.01)
(Continued)

(52) U.S. Cl.
CPC ........... *F01N 9/00* (2013.01); *B01D 53/0438* (2013.01); *B01D 53/0454* (2013.01); *F01N 3/05* (2013.01); *F01N 3/085* (2013.01); *F01N 3/0807* (2013.01); *F01N 13/082* (2013.01); *F01N 13/1805* (2013.01); *F01N 13/1822* (2013.01); *B01D 2253/102* (2013.01); *B01D 2253/108* (2013.01);
(Continued)

(58) Field of Classification Search
CPC ........ B01D 2253/102; B01D 2253/108; B01D 2253/1124; B01D 2259/4566; B01D 53/0438; B01D 53/0454; F01N 13/082; F01N 13/1805; F01N 13/1822; F01N 2240/02; F01N 2240/18; F01N 2450/10; F01N 2590/08; F01N 2900/1404; F01N 3/05; F01N 3/0807; F01N 3/085; F01N 9/00; Y02T 10/20
See application file for complete search history.

(56) References Cited

U.S. PATENT DOCUMENTS 3,417,549 A  12/1968  Leosis
4,277,442 A   7/1981  Hergart
(Continued)

FOREIGN PATENT DOCUMENTS

CN    101641144 A    2/2010

OTHER PUBLICATIONS

International Search Report (dated Feb. 2, 2016) for corresponding International App. PCT/EP2015/062433.
(Continued)

*Primary Examiner* — Anthony Ayala Delgado
(74) *Attorney, Agent, or Firm* — Venable LLP; Jeffri A. Kaminski

(57) ABSTRACT

An exhaust gas treatment apparatus is provided for use together with a diesel engine in an indoor environment, where the diesel engine is part of, e.g., a vehicle or other machinery. A method of controlling such an exhaust gas treatment apparatus is also provided.

10 Claims, 3 Drawing Sheets

(51) Int. Cl.
  *F01N 13/08* (2010.01)
  *F01N 13/18* (2010.01)
  *B01D 53/04* (2006.01)
  *F01N 3/05* (2006.01)
(52) U.S. Cl.
  CPC ............... B01D 2253/1124 (2013.01); B01D 2259/4566 (2013.01); F01N 2240/02 (2013.01); F01N 2240/18 (2013.01); F01N 2450/10 (2013.01); F01N 2590/08 (2013.01); F01N 2900/1404 (2013.01); Y02T 10/20 (2013.01)

(56) References Cited

U.S. PATENT DOCUMENTS

| | | | | |
|---|---|---|---|---|
| 4,373,377 A | * | 2/1983 | Smith | F16J 15/46 285/97 |
| 5,603,215 A | * | 2/1997 | Sung | B01D 53/944 60/274 |
| 5,916,129 A | | 6/1999 | Modica et al. | |
| 5,956,946 A | * | 9/1999 | Yamada | B01D 53/9454 60/296 |
| 5,983,628 A | * | 11/1999 | Borroni-Bird | F01N 3/05 60/274 |
| 6,185,934 B1 | | 2/2001 | Teboul | |
| 7,377,101 B2 | | 5/2008 | Mital et al. | |
| 8,257,471 B2 | | 9/2012 | Kanazawa et al. | |
| 2005/0178107 A1 | | 8/2005 | Mital et al. | |
| 2011/0011066 A1 | * | 1/2011 | Back | F01N 3/0253 60/295 |

OTHER PUBLICATIONS

MONOXIVENT—Portable Ferree Eilminator Pruduct Overview.
EHC AVGASFILTER (2010).
EHC Exhaustgasf Filter (Jul. 2013).
Chinese Office Action dated Jul. 26, 2019 in corresponding CN Application No. 201580080604, 15 pages.

* cited by examiner

EXHAUST GAS TREATMENT APPARATUS

BACKGROUND AND SUMMARY

The invention generally relates to an exhaust gas treatment apparatus for use together with an internal combustion engine in an indoor environment, where the diesel internal combustion is comprised with e.g. a vehicle or other machinery. The invention also relates to a method of controlling a mobile exhaust gas treatment apparatus.

Recent advances in the design and operation of aftertreatment systems for internal combustion engines, typically integrated with a vehicle or other machinery, have radically improved the removal of diesel particulate matter or soot from exhaust gas of the internal combustion engine. Such an aftertreatment system typically includes a diesel particulate filter.

The aftertreatment systems are very robust and durable, but, depending on operation mode, can build up contaminants within the diesel particulate filter, which are primarily carbon particles or soot, that over time affect the system performance. As more particulates accumulate in the filter, the increasing restriction to exhaust flow results in a gradual increase in exhaust back pressure, i.e. the pressure within the exhaust upstream of the filter. If the filter is not properly maintained, the exhaust back pressure may increase to a point which could jeopardize engine component life. There is thus a need to regenerate and desulfate exhaust system components on a regular basis for efficient operation.

Regeneration of diesel particulate filters requires heating the filters to temperatures above 450° C., for a period depending on filter size, type, soot amount and regeneration conditions, for example, for a diesel truck highway operation engine operating normally, for about 10 minutes to over 1 hour.

Under sons conditions, it may be desirable to perform the regeneration under standstill conditions, a so called "parked" or "stationary" regeneration. It offers e.g. the vehicle driver the option, if needed, of performing regeneration outside the normal duty cycle. Under such condition, the mixing of the emitted exhaust may be low, resulting in elevated levels of potentially smelly or hazardous compounds around the vehicle. In addition, care must then be taken in regards to the surrounding of e.g. the vehicle due to the elevated exhaust temperature, typically above 500° C., potentially causing risks of fire within surrounding structures.

Accordingly, it would be desirable to improve the possibility to perform a parked or stationary regeneration of the diesel particulate filter, specifically taking into the potential environmental and temperature related risks mentioned above.

According to an aspect of the invention, the above is at least partly alleviated by an exhaust gas treatment apparatus, comprising an exhaust conduit having a first end adapted to be removably connected to an exhaust pipe of an internal combustion engine, and an adsorption bed comprising an adsorbent material for the adsorption of elements of engine exhaust gases, the adsorption bed being operatively connected to a second end of the exhaust conduit for receiving the engine exhaust gases, wherein the exhaust gas treatment apparatus further comprises a heat adjustment unit arranged upstream of the adsorption bed and downstream of the first end of the exhaust conduit, wherein the heat adjustment unit is configured to adjust a temperature of the engine exhaust gas to be within a temperature range selected based on the adsorbent material.

The present invention, according to an aspect thereof, typically allows for swift handling; of exhaust gases from the internal combustion engine, specifically exhaust gases resulting from a regeneration process of an aftertreatment system comprised with the internal combustion engine, in situations where normally a parked or stationary regeneration generally would be undesirable. Such a situation may for example be when the internal combustion engine is arranged indoors or in relatively close vicinity of human personnel, that is, in situations where potentially smelly or hazardous compounds resulting from the regeneration process would be undesirable to be inhaled by the human personnel and/or where venting is hard to facilitate.

The exhaust gas treatment apparatus according to the invention is arranged external from the internal combustion engine. Specifically, the exhaust gas treatment apparatus is arranged as a separate entity/unit in relation to the vehicle or machinery, advantageously adapted to be connected to different types of vehicles and/or machineries. As such, the exhaust conduit is preferably extendible to allow for connection to an exhaust pipe independent on its placement in relation to the internal combustion engine. Similarly, the first end of the exhaust conduit is preferably adjustable in relation to its circumference, allowing it to be connected to different types of exhaust pipes.

In addition, by means of the invention and the thereto comprised heat adjustment unit, it will also be possible to allow for exhaust gases from different types of internal combustion engines to be processed by the exhaust gas treatment apparatus. As mentioned above, the regeneration process typically requires heating to temperatures above 450° C., a resulting exhaust gas temperature that generally would be unsuitable for direct provision to the adsorption material and/or the adsorption bed. In addition, due to the flexibility of the exhaust gas treatment apparatus for connection to different types of internal combustion engines, it may generally be expected that the exhaust gas temperature during a regeneration process may differ for the different types of internal combustion engines. Accordingly, the controllable heat adjustment unit comprised with the exhaust gas treatment will allow the exhaust gases to be adjusted to best suit the adsorption material and/or the adsorption bed for optimizing the adsorption process.

The exhaust gases generated during the regeneration process typically includes sulphur compounds and particulates. The adsorption bed, by means of the inclusion of the adsorption material, allows for an adsorption process to take place in relation to these exhaust gases. During the adsorption process atoms or molecules comprises with the exhaust gases move from the gaseous phase onto the surface of a solid substrate, in this case the adsorption material arranged within the adsorption bed. Typically, the adsorption material is temperature dependent, and the present invention allows for the adaptation of the exhaust gases to correspond to a desirable temperature range matching the specific (or combination of) adsorption material(s) used. The adsorbent material may for example comprise at least one of CaO, BaO, beta zeolites, and activated carbon.

In a preferred embodiment of the invention the exhaust gas treatment apparatus is mobile. It is thus desirable to combine the component of the exhaust gas treatment apparatus in such a manner that the exhaust gas treatment apparatus may be quickly moved from one internal combustion engine to the next. It would of course be suitable to take into account the handling of possible excess heat generated by the heat adjustment unit, i.e. in an operation of the heat adjustment unit where it is desired to lower the temperature of the exhaust gases. The mobile exhaust gas treatment apparatus may be arranged to be carried between different operational points or may be arranged onto a carriage.

The exhaust gas treatment apparatus preferably also comprises a control unit for controlling the operating the heat adjustment unit. As such the control unit may be configured to adaptively control the heat adjustment unit for optimizing the temperature of the exhaust gases. In an embodiment, the control unit is configured to receive an indication of the temperature of the engine exhaust gas and to operate the heat adjustment unit based on the temperature and the preselected temperature range of the adsorbent material. The temperature indication may for example be provided by means of one or a plurality of temperature sensors comprised with the exhaust gas treatment apparatus, preferably arranged to monitor the engine exhaust gas temperature at or upstream of the heat adjustment unit In some embodiment of the invention it may be desirable to configure the control unit such that it may receive an indication from the internal combustion engine of an upcoming regeneration. With such information at hand, it could be possible for the control unit to e.g. pre-heat the adsorption material, e.g. for optimal performance already from the initial phase of the regeneration.

In a preferred embodiment of the invention the heat adjustment unit is a heat exchanger. The heat exchanger may be arranged for adjusting the temperature in both an upward and a downward direction, even though the most likely scenario for operating the heat exchanger is for lowering the temperature of the exhaust gases. In an embodiment it may be desirable to connect the heat exchanger to a heating or cooling system arranged in connection to the internal combustion engine, thereby making e.g. good use of excess heat generated by the heat exchanger when lowering the temperature of the exhaust gases. The excess heat may also be used for e.g. heating an environment surrounding the exhaust gas treatment apparatus.

Preferably, the heat adjustment unit additionally comprises a diffusor pipe for allowing mixing of the engine exhaust gases with ambient air. Such an embodiment may in some implementations be sufficient for lowering the temperature of the exhaust gases to be within the desired temperature range for the adsorption material as is indicated above (in such an embodiment seen as forming part of the heat adjustment unit).

In a preferred embodiment of the invention the exhaust gas treatment apparatus further comprises a fan adapted to control an exhaust gas throughput of the adsorption bed. The operation of the fan may possibly be subject to a current temperature of the exhaust gases and/or a current (expected or measured) content of the potentially smelly or hazardous compounds. In addition, the fan ensures that the exhaust gases passed the adsorption bed and refrain from leaking into the surrounding of the exhaust gas treatment apparatus.

In a preferred embodiment the exhaust gas treatment apparatus is arranged for treating exhaust gases via the adsorption bed during a regeneration of an exhaust aftertreatment system of the vehicle or machinery, for example including construction equipment, equipped with the internal combustion engine. The exhaust aftertreatment system may include at least one of a diesel particulate filter, a selective catalytic reduction (SCR) system and a diesel oxidation catalyst (DOC) system.

According to another aspect of the present invention there is provided a method for treating exhaust gases of an internal combustion engine, wherein the method comprises the steps of connecting an exhaust gas treatment apparatus to an exhaust pipe of the internal combustion engine, identifying an engine exhaust gas temperature, adapting the exhaust gas temperature prior to the engine exhaust gases entering an adsorption bed in the exhaust gas treatment apparatus so that the exhaust gas temperature is within a temperature range selected based on an adsorbent material in the adsorption bed, and subjecting the adsorption bed for the exhaust gases for adsorption of elements of the engine exhaust gases. This aspect of the invention provides similar advantages as discussed above in relation to the previous aspect of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
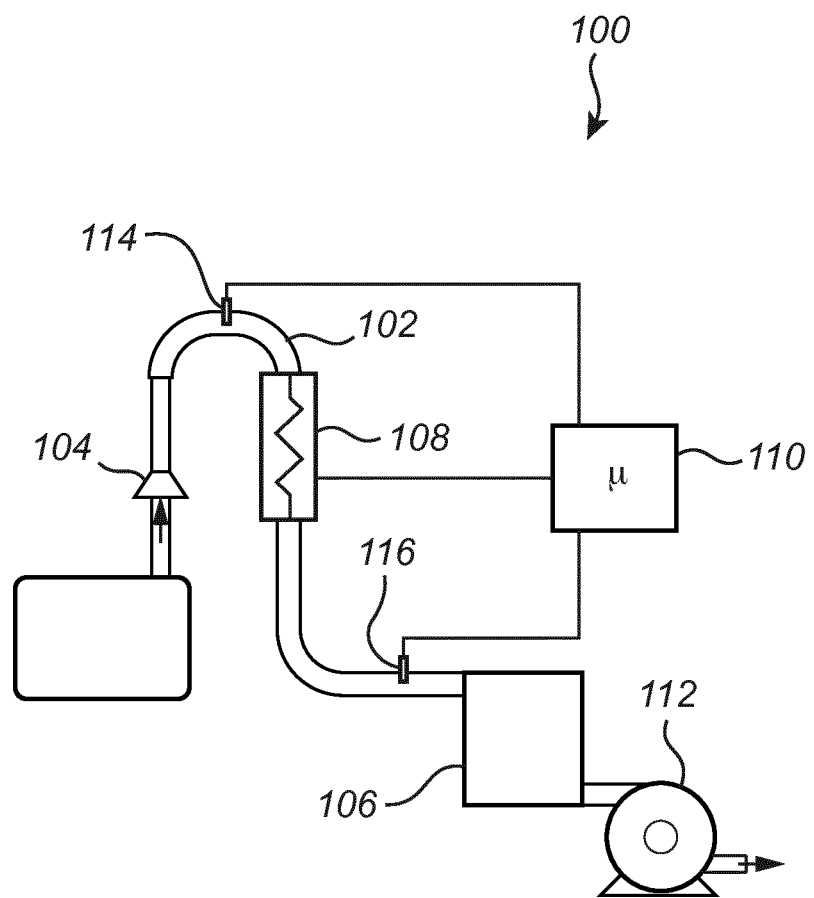
FIG. 1 illustrates an exemplary exhaust gas treatment apparatus according to a currently preferred embodiment of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Figure 2A:
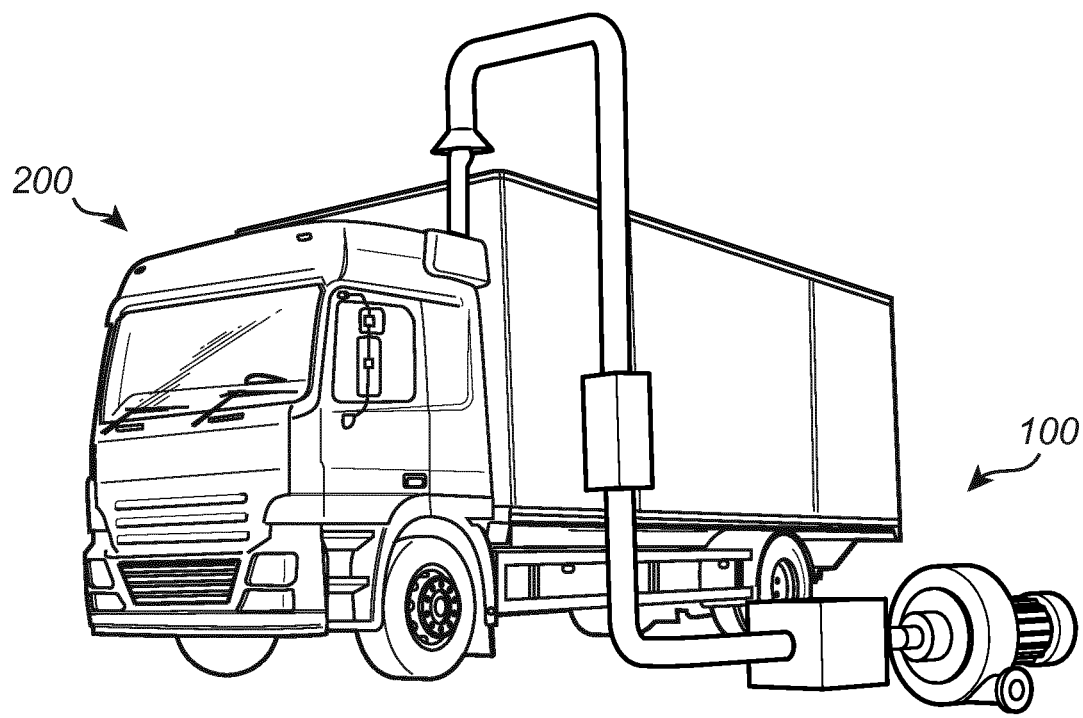
FIGS. 2A and 2B shows exemplary scenarios of the inventive exhaust gas treatment apparatus in connection with a vehicle and a machine, respectively.
Figure 2B:
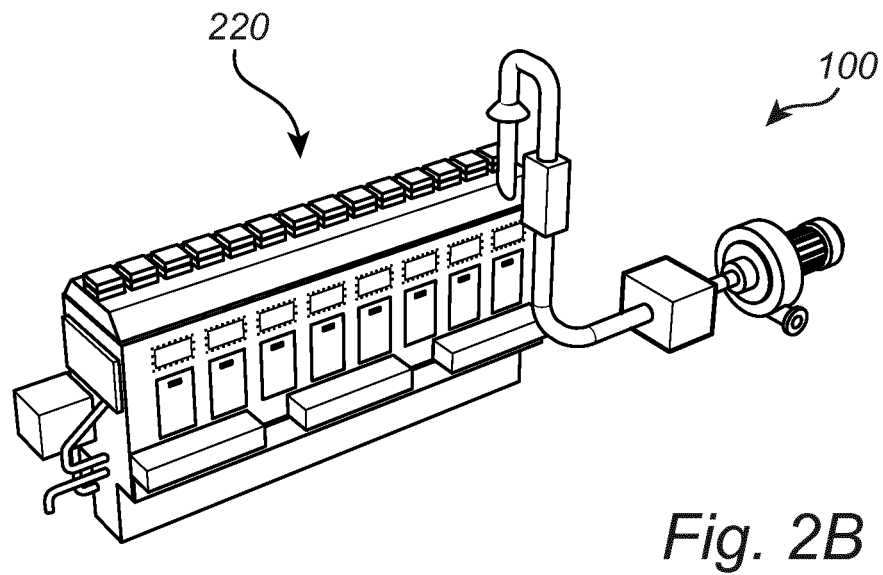

Referring now to the drawings and to FIG. 1 in particular, there is depicted an exemplary exhaust gas treatment apparatus 100 according to the invention to be connected to an exhaust pipe of an internal combustion engine of e.g. a vehicle or a machine has will be further discussed in relation to FIGS. 2A and 2B). The exhaust gas treatment apparatus 100 comprises an exhaust conduit 102 having a connector 104 for allowing removable connection to the exhaust pipe. The exhaust conduit 102 provides an exhaust gas passage from the exhaust pipe to an adsorption bed 106 holding an adsorption material.

The exhaust gases provided at the exhaust pipe will during a regeneration process of an exhaust aftertreatment system comprised with the internal combustion engine reach an elevated temperature, typically above 450° C. The exhaust gas treatment apparatus 100 is therefore equipped with a heat adjustment unit arranged downstream of the connector 104 and upstream of the adsorption bed 106. In the illustrated embodiment, the heat adjustment unit is a controllable heat exchanger 108, connected to a control unit 110, the control unit 110 also comprised with the exhaust gas treatment apparatus 100.

Furthermore, the exhaust gas treatment apparatus 100 comprises a fan 112 and at least a first and a second temperature sensor 114, 116, all connected and operable by the control unit 110. The first temperature sensor 114 is arranged upstream of the heat exchanger 108 and the second temperature sensor 116 is arranged downstream of the heat exchanger 108, just prior to the exhaust gases entering the adsorption bed 106.

The control unit 110 may include a general purpose processor, an application specific processor, a circuit containing processing components, a group of distributed processing components, a group of distributed computers configured for processing etc. The processor may be or include any number of hardware components for conducting data or signal processing or for executing computer code stored in memory. The memory may be one or more devices for storing data and/or computer code for completing or facilitating the various methods described in the present description. The memory may include volatile memory or nonvolatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor and includes computer code for executing one or more processes described herein.

The adsorption material comprised within the adsorption bed 106, typically for desulfurization of the exhaust gases from the regeneration process of the internal combustion engine, may include adsorbents based on zeolites, mixed metal oxides, activated carbon and supported metal compounds. In an embodiment, at least one of or a mixture of CaO, BaO, beta zeolites and activated carbon are used, however other possible present and/or future adsorption materials are within the scope of the invention.

Figure 3:
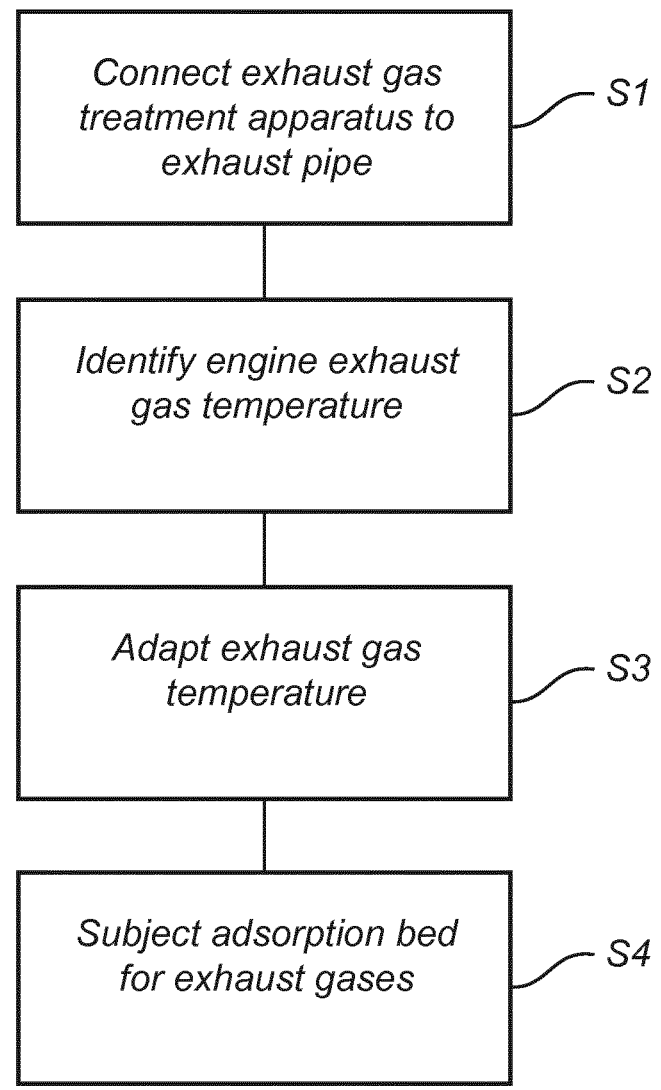
FIG. 3 conceptually illustrates the processing steps for performing the method according to the invention.

During operation of the exhaust gas treatment apparatus 100, with further reference to FIG. 3, the connector 104 is firmly connected, S1, to the exhaust pipe of the internal combustion engine. Once there is a desire to perform a regeneration process of the exhaust aftertreatment system comprised with the internal combustion engine, a signal may optionally be transmitted from the internal combustion engine to the control unit 110 of the exhaust gas treatment apparatus 100, for preparing the exhaust teas treatment apparatus 100 for handling of exhaust gases form the internal combustion engine. The control unit 110 may in turn activate the fan 112 to create a negative pressure at the adsorption bed 106, thereby limiting any leakage to the environment surrounding the exhaust gas treatment apparatus 100.

The temperature sensor 114 arranged prior to the heat exchanger 108 may also detect a "drastically" increasing change in temperature, typically being indicative of the start of a regeneration process. Such an indication may also be used for activating the fan 112.

According to the invention it is desirable to adjust the temperature of the exhaust gases to be within a temperature range corresponding to a temperature being suitable for the adsorption material arranged within the adsorption bed. In an embodiment, it is desirable to keep the exhaust gas temperatures, when entering the adsorption bed 106, to be less than 200° C. As the exhaust gases, during regeneration, may reach temperatures exceeding 450-500° C., a significant amount of heat energy needs to be removed from the exhaust gases, by means of the heat exchanger 108.

In an embodiment, the heat exchanger 108 is air cooled, for example by adjusting an amount of air flowing past e.g. coils of the heat exchanger 108 provided for conducting the exhaust gases. In another embodiment the heat exchanger 108 is liquid cooled, for example using water, oil, etc. The heat exchanger 108 may also, alternatively, be connected to a cooling/heating system comprised with the internal combustion engine, for handling the excess heat, etc.

The temperature sensors 114, 116, the fan 112 and the heat exchanger 108 will all be controlled by the control unit 110 for adjusting the temperature of the exhaust gases as a reaction to an identified, S2, exhaust gas temperature, such that the exhaust gases entering the adsorption bed 106 are adapted, S3, to be within the desired temperature range. The control unit 110 may for example implement a PI/PD/PID controller, or similar, for adjusting the temperature of the exhaust gases. Once reaching the adsorption bed 106, the exhaust gases will subjecting, S4, the adsorption bed for undergoing the adsorption process as outlined above.

Turning now to FIGS. 2A and 2B, illustrating two alternative embodiments where the inventive exhaust gas treatment apparatus 100 would be useful. The first embodiment shown in FIG. 2A illustrates a truck 200, where an exhaust pipe of the truck 200 is connected to the connector 104 of the exhaust gas treatment apparatus 100. In relation to FIG. 2A, the exhaust conduit 102 is provided with an extension for allowing connection also to exhaust pipes arranged in an elevated position. It may in such an embodiment be suitable to include an extended frame with the exhaust gas treatment apparatus 100 for simplifying safe connection by the exhaust conduit 102 to the exhaust pipe.

The exhaust conduit 102 may in some embodiments be partly rigid and partly flexible. In the illustrated embodiment the truck 200 is normally operated in a partly vented indoor environment, such as within an underground mine. The exhaust gases generated during "normal operation" are handled by the (normal) ventilation system arranged within the mine, however, such a ventilation system is normally not equipped for handling the extensive exhaust gases generated during a regeneration process of the exhaust aftertreatment system provided with the internal combustion engine of the truck 200. Thus, the inventive exhaust gas treatment apparatus 100 will allow also the regeneration process to be handled inside of the underground mine, without the necessity of moving the truck 200 to the outdoor. This will accordingly allow for prolonged fully operational use of the truck 200.

When necessary, e.g. a driver of the truck 200 may activate the regeneration process. The activation may simultaneously broadcast a wireless signal being indicative of the upcoming regeneration process, where the signal picked up by a wireless receiver comprised with the exhaust gas treatment apparatus 100, thereby preparing the exhaust gas treatment apparatus 100 for handling the elevated exhaust gases, etc.

FIG. 2B shows a second embodiment where the inventive exhaust gas treatment apparatus 100 would be useful. In FIG. 2B the internal combustion engine is comprised with mobile power station 220, the mobile power station 200 arranged in an indoor partly vented environment. Again, the normal ventilation in the indoor environment is capable of handling the exhaust gases generated by the mobile power station 220 during "normal" operation. However, in some instances it will be desirable to perform a regeneration process for an exhaust aftertreatment system provided with the internal combustion engine of the mobile power station 200. Similar the above, the inventive exhaust gas treatment apparatus 100 will allow also the regeneration process to be handled within the indoor environment, without the necessity of moving the mobile power station 220 to the outdoor, thereby possibly reducing any lost in important production time.

It should be understood that the exhaust gas treatment apparatus 100 also could be connected to a car, any form of machinery, construction equipment such as a dumper truck, a wheel loader, etc.

In summary, the present invention relates to an exhaust gas treatment apparatus, comprising an exhaust conduit having a first end adapted to be removably connected to an exhaust pipe of an internal combustion engine, and an adsorption bed comprising an adsorbent material for the adsorption of elements of engine exhaust gases, the adsorption bed being operatively connected to a second end of the exhaust conduit for receiving the engine exhaust gases, wherein the exhaust gas treatment apparatus further comprises a heat adjustment unit arranged upstream of the adsorption bed and downstream of the first end of the exhaust conduit, wherein the heat adjustment unit is configured to adjust a temperature of the engine exhaust gas to be within a temperature range selected based on the adsorbent material.

The advantage with such a system is improved handling of exhaust gases from the internal combustion engine, specifically exhaust gases resulting from a regeneration process of an aftertreatment system comprised with the internal combustion engine, in situations where normally a parked or stationary regeneration generally would be undesirable.

In addition, the control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor.

When information is transferred or provided over a network or another communications connection (either hardwired, wireless, or a combination of hardwired or wireless) to machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer or special purpose processing machines to perform a certain function or group functions.

Although the figures may show a sequence the order of the steps may differ from what is depicted. Also two or more steps may be performed concurrently or with partial concurrency. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art. Further, a single unit may perform the functions of several means recited in the claims. In the claims, any reference signs placed between parentheses shall not be construed as limiting to the claim. Furthermore, in the claims, the word "comprising" does not exclude other elements or steps, and the indefinite article "a" or "an" does not exclude a plurality.

Variations to the disclosed embodiments can be understood and effected by the skilled addressee in practicing, the claimed invention, from a study of the drawings, the disclosure, and the appended claims. The person skilled in the art realizes that the present invention is not limited to the preferred embodiments.

The invention claimed is:

1. A mobile exhaust gas treatment apparatus, comprising:
an exhaust conduit having a first end adapted to be removably connected to an exhaust pipe of an internal combustion engine;
an adsorption bed comprising an adsorbent material for the adsorption of elements of engine exhaust gases, the adsorption bed being operatively connected to a second end of the exhaust conduit for receiving the engine exhaust gases;
a heat adjustment unit arranged upstream of the adsorption bed and downstream of the first end of the exhaust conduit, wherein the heat adjustment unit is configured to adjust a temperature of the engine exhaust gas to be within a temperature range selected based on the adsorbent material,
and
a control unit for controlling an operation of the heat adjustment unit, wherein the control unit is configured to receive an indication of the temperature of the engine exhaust gas and to operate the heat adjustment unit based on the temperature of the engine exhaust gas, the temperature of the exhaust gas to be within the temperature range selected based on the adsorbent material,
wherein the exhaust gas treatment apparatus further comprises:
a fan adapted to control an exhaust gas throughput of the adsorption bed, and
a temperature sensor connected to the control unit and arranged to monitor the engine exhaust gas temperature at or upstream of the heat adjustment unit, the temperature sensor adapted to detect increasing change in temperature being indicative of the start of a regeneration process and to thereby activate the fan,
wherein the adsorbent material comprises at least one of CaO, BaO, beta zeolites, and activated carbon.

2. The mobile exhaust gas treatment apparatus according to claim 1, wherein the first end of the exhaust conduit is adapted to be removably fitted to different types of exhaust pipes.

3. The mobile exhaust gas treatment apparatus according to claim 1, wherein the heat adjustment unit is a heat exchanger.

4. The mobile exhaust gas treatment apparatus 4 according to claim 3, wherein the heat exchanger is adapted to be connect to a heating or cooling system arranged in connection the internal combustion engine to which the exhaust gas treatment apparatus is configured to be connected.

5. The mobile exhaust gas treatment apparatus according to claim 1, wherein the heat adjustment unit comprises a diffusor pipe for allowing mixing of the engine exhaust gases with ambient air.

6. The mobile exhaust gas treatment apparatus according to claim 1, wherein the adsorption bed is adapted for at least one of ionic bonding or adsorption by a chemical reaction with the adsorption material.

7. The mobile exhaust gas treatment apparatus according to claim 1, wherein the exhaust gas treatment apparatus is arranged for being removably connected to the exhaust pipe when a vehicle equipped with the internal combustion engine, to which the exhaust gas treatment apparatus is configured to be connected, is in a standstill condition.

8. A method for treating exhaust gases of an internal combustion engine of a vehicle using a mobile exhaust gas treatment apparatus, wherein the mobile exhaust gas treatment apparatus further comprises a fan adapted to control an exhaust gas throughput of an adsorption bed and a temperature sensor connected to a control unit and arranged to monitor an engine exhaust gas temperature at or upstream of a heat adjustment unit, wherein the method comprises the steps of:
connecting the mobile exhaust gas treatment apparatus to an exhaust pipe of the internal combustion engine;
identifying the engine exhaust gas temperature;
adapting the exhaust gas temperature prior to the engine exhaust gases entering an adsorption bed in the mobile exhaust gas treatment apparatus so that the exhaust gas temperature is within a temperature range selected based on an adsorbent material in the adsorption bed; and
subjecting the adsorption bed for the exhaust gases for adsorption of elements of the engine exhaust gases,
wherein the step of adapting the exhaust gas temperature via controlling the operation of the heat adjustment unit in the mobile exhaust gas treatment apparatus is based on the engine exhaust gas temperature and the adsorption temperature range, the step of subjecting comprises treating the exhaust gases via the adsorption bed during a regeneration of an exhaust system of the vehicle equipped with the internal combustion engine, the adsorbent material comprise at least one of CaO, BaO, beta zeolites, and activated carbon, and the temperature sensor adapted to detect a increasing change in temperature being indicative of the start of the regeneration of the exhaust system and to thereby activate the fan.

9. The method according to claim 8, wherein the method further comprises the step of: temporarily connecting the mobile exhaust gas treatment apparatus to the exhaust pipe of the internal combustion engine when the vehicle equipped with the internal combustion engine is in a standstill condition.

10. The method according to claim 9, wherein the method further comprises the step of: disconnecting the mobile exhaust gas treatment apparatus from the exhaust pipe of the internal combustion engine after the exhaust gas treatment and before the vehicle takes off.

* * * * *